US011091195B2

(12) United States Patent
Shoji

(10) Patent No.: US 11,091,195 B2
(45) Date of Patent: Aug. 17, 2021

(54) MOTOR CONTROL DEVICE AND MOTOR CONTROL METHOD

(71) Applicant: JTEKT CORPORATION, Osaka (JP)

(72) Inventor: Naoki Shoji, Uda (JP)

(73) Assignee: JTEKT CORPORATION, Osaka (JP)

( * ) Notice: Subject to any disclaimer, the term of this patent is extended or adjusted under 35 U.S.C. 154(b) by 112 days.

(21) Appl. No.: 16/568,679

(22) Filed: Sep. 12, 2019

(65) Prior Publication Data

US 2020/0094870 A1 Mar. 26, 2020

(30) Foreign Application Priority Data

Sep. 21, 2018 (JP) .............................. JP2018-177930

(51) Int. Cl.
*B62D 5/04* (2006.01)
*G01L 5/22* (2006.01)

(52) U.S. Cl.
CPC ......... *B62D 5/0463* (2013.01); *B62D 5/0481* (2013.01); *G01L 5/221* (2013.01)

(58) Field of Classification Search
CPC ...... B62D 5/0463; B62D 5/0481; G01L 5/221
See application file for complete search history.

(56) References Cited

U.S. PATENT DOCUMENTS

2017/0021859 A1 1/2017 Kodera
2020/0346687 A1* 11/2020 Sakaguchi ......... B62D 15/0235

FOREIGN PATENT DOCUMENTS

EP 2757022 A1 7/2014
EP 2772412 A2 9/2014
JP 2006-175940 A 7/2006

OTHER PUBLICATIONS

Feb. 11, 2020 Extended European Search Report issued in European Patent Application No. 19197560.6.

* cited by examiner

*Primary Examiner* — Zoheb S Imtiaz
(74) *Attorney, Agent, or Firm* — Oliff PLC

(57) ABSTRACT

A motor control device for controlling drive of an electric motor that controls a steering angle of a steering device, the motor device includes: a torque sensor and an electronic control unit. The torque sensor is configured to detect steering torque acting on a steering member. The electronic control unit is configured to: generate a steering angle command value based on the steering torque by using an equation of motion that is a reference model of the steering device; control driving of the electric motor so that an actual steering angle follows the steering angle command value; and limit a virtual reaction force that is a reaction force component of the equation of motion.

5 Claims, 12 Drawing Sheets

MOTOR CONTROL DEVICE AND MOTOR CONTROL METHOD

INCORPORATION BY REFERENCE

The disclosure of Japanese Patent Application No. 2018-177930 filed on Sep. 21, 2018 including the specification, drawings and abstract is incorporated herein by reference in its entirety.

BACKGROUND

1. Technical Field

The disclosure relates to motor control devices and motor control methods for electric motors for controlling a steering angle.

2. Description of Related Art

Japanese Patent Application Publication No. 2006-175940 discloses a controller (motor control device). This controller includes a downstream-side reference model that determines a target wheel steering angle based on operation torque (steering torque) detected by a torque sensor. This controller thus controls driving of an electric motor so that an actual wheel steering angle follows the target wheel steering angle.

SUMMARY

The range of steering torque that can be detected by a torque sensor is limited. Accordingly, in the disclosure described in Japanese Patent Application Publication No. 2006-175940, for example, even if steering torque the driver applies to a steering wheel changes to a value larger than the detection upper limit of the torque sensor, the detected torque does not change from the detection upper limit, so that a target wheel steering angle is fixed to a value corresponding to the detection upper limit of the steering torque. The driver therefore cannot perform a steering operation by a steering angle larger than the target wheel steering angle corresponding to the detection upper limit. Similarly, when the steering torque the driver applies to the steering wheel reaches the maximum value the driver can apply, a value larger than a target wheel steering angle corresponding to the maximum value cannot be calculated. The driver therefore cannot perform any further steering operation.

The disclosure provides a motor control device and a motor control method which can restrain the range of a steering angle command value from being limited by the detectable range of a torque sensor or a maximum value of steering torque the driver can apply to a steering member.

A first aspect of the disclosure provides a motor control device for controlling driving of an electric motor that controls a steering angle of a steering device. The motor control device includes a torque sensor and an electronic control unit. The torque sensor is configured to detect steering torque acting on a steering member. The electronic control unit is configured to: generate a steering angle command value based on the steering torque by using an equation of motion that is a reference model of the steering device; control driving of the electric motor so that an actual steering angle follows the steering angle command value; and limit a virtual reaction force that is a reaction force component of the equation of motion.

In this configuration, the virtual reaction force that is used to generate the steering angle command value is limited to prevent the equation of motion from being in a steady state. The range of the steering angle command value can thus be restrained from being limited by the detectable range of the torque sensor or a maximum value of the steering torque the driver can apply to the steering member.

In the first aspect, the electronic control unit may be configured to limit the virtual reaction force in the equation of motion so that an absolute value of the virtual reaction force becomes smaller than a maximum possible value of an absolute value of driving torque that is a driving component resulting from the steering torque.

In the first aspect, the virtual reaction force may include a virtual spring reaction force, and the electronic control unit may be configured to limit an absolute value of the virtual spring reaction force to a value equal to or smaller than a first predetermined value.

In the first aspect, the virtual reaction force may be a sum of a virtual spring reaction force and a virtual damper reaction force, and the electronic control unit may be configured to limit an absolute value of the sum of the virtual spring reaction force and the virtual damper reaction force to a value equal to or smaller than a second predetermined value.

In the first aspect, the virtual reaction force may include a virtual spring reaction force that is calculated as a product of a spring constant and the steering angle command value, the electronic control unit may be configured to set the spring constant to a fourth predetermined value when an absolute value of the steering angle command value is equal to or smaller than a third predetermined value, and the electronic control unit may be configured to reduce the spring constant to a value smaller than the fourth predetermined value when the absolute value of the steering angle command value is larger than the third predetermined value.

A second aspect of the disclosure is a motor control method for controlling driving of an electric motor that controls a steering angle of a steering device. The motor control method includes: detecting, by a torque sensor, steering torque acting on a steering member; generating, by an electronic control unit, a steering angle command value based on the steering torque by using an equation of motion that is a reference model of the steering device; controlling, by the electronic control unit, the electric motor so that an actual steering angle follows the steering angle command value; and limiting, by the electronic control unit, a virtual reaction force that is a reaction force component of the equation of motion.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Figure 1:
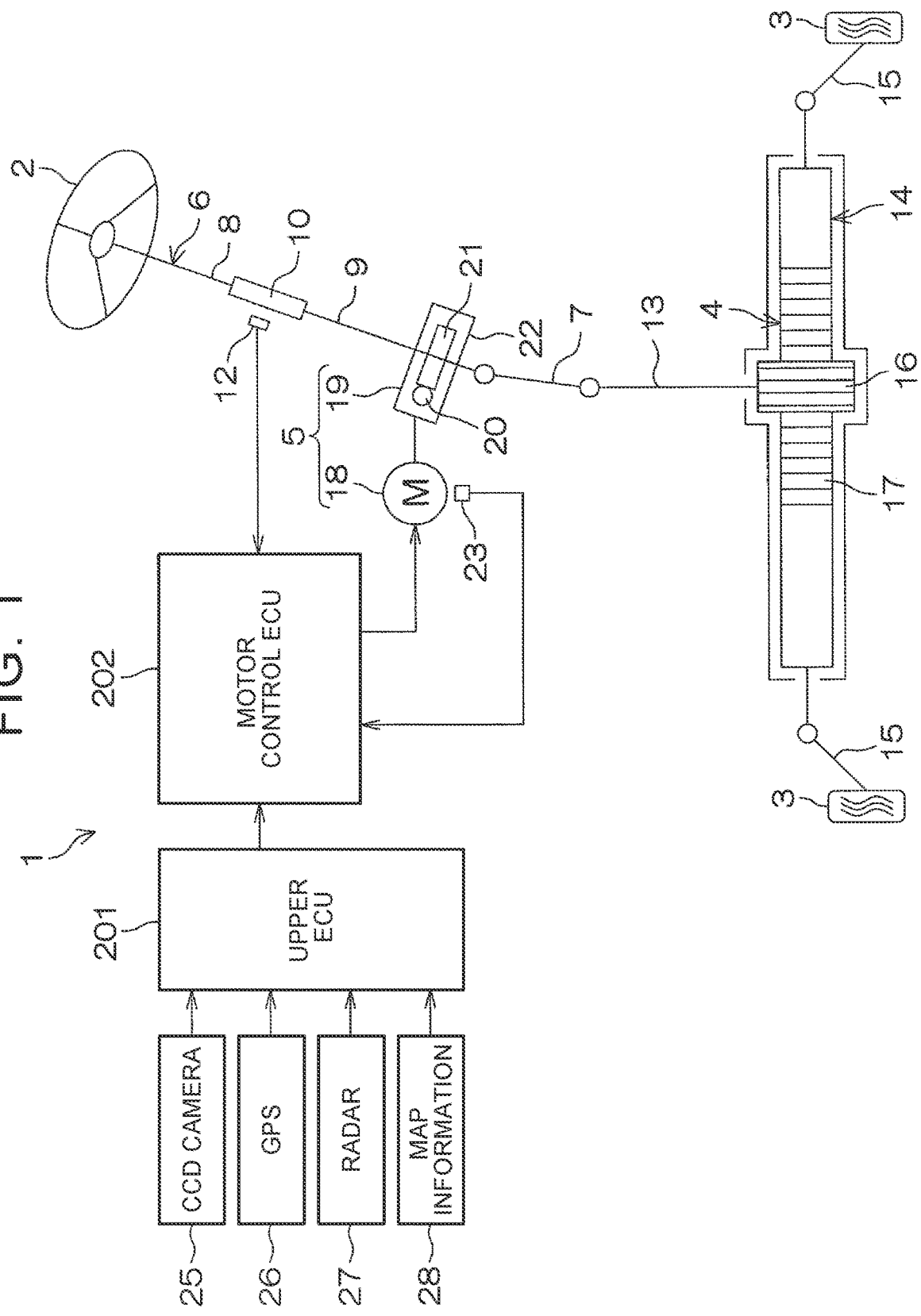
FIG. 1 is a schematic view showing a schematic configuration of an electric power steering system to which a motor control device according to an embodiment of the disclosure is applied.

FIG. 1 is a schematic diagram showing a schematic configuration of an electric power steering system to which a motor control device according to an embodiment of the disclosure is applied. An electric power steering system 1 includes a steering wheel 2 as a steering member that steers a vehicle, a steering operation mechanism 4 that steers steered wheels 3 according to rotation of the steering wheel 2, and a steering assist mechanism 5 that assists driver's steering operation. The steering wheel 2 and the steering operation mechanism 4 are mechanically coupled via a steering shaft 6 and an intermediate shaft 7.

The steering shaft 6 includes an input shaft 8 coupled to the steering wheel 2 and an output shaft 9 coupled to the intermediate shaft 7. The input shaft 8 and the output shaft 9 are coupled via a torsion bar 10 so as to be rotatable relative to each other. A torque sensor 12 is disposed near the torsion bar 10. The torque sensor 12 detects steering torque (torsion bar torque) $T_d$ applied to the steering wheel 2, based on the relative rotation displacement between the input shaft 8 and the output shaft 9. For example, in the present embodiment, the steering torque $T_d$ detected by the torque sensor 12 (hereinafter also referred to as the "detected torque") takes a positive value when it is torque for steering to the left and takes a negative value when it is torque for steering to the right. The larger the absolute value of the steering torque $T_d$ is, the larger the magnitude of the steering torque $T_d$ is.

The steering operation mechanism 4 is formed by a rack and pinion mechanism including a pinion shaft 13 and a rack shaft 14 as a steered shaft. The steered wheels 3 are coupled to the ends of the rack shaft 14 via a tie rod 15 and a knuckle arm (not shown). The pinion shaft 13 is coupled to the intermediate shaft 7. The pinion shaft 13 rotates according to the steering operation of the steering wheel 2. A pinion 16 is coupled to the tip end of the pinion shaft 13.

The rack shaft 14 extends straight in the lateral direction of the vehicle. The rack shaft 14 has a rack 17 in its intermediate portion in the axial direction. The rack 17 meshes with the pinion 16. The pinion 16 and the rack 17 convert rotation of the pinion shaft 13 to axial movement of the rack shaft 14. The steered wheels 3 can be steered as the rack shaft 14 is moved in the axial direction.

When the steering wheel 2 is steered (rotated), this rotation of the steering wheel 2 is transmitted to the pinion shaft 13 via the steering shaft 6 and the intermediate shaft 7. Rotation of the pinion shaft 13 is converted to axial movement of the rack shaft 14 by the pinion 16 and the rack 17. The steered wheels 3 are thus steered. The steering assist mechanism 5 includes an electric motor 18 and a reduction gear 19. The electric motor 18 generates a steering assist force (assist torque), and the reduction gear 19 amplifies output torque of the electric motor 18 to transmit the amplified output torque to the steering operation mechanism 4. The reduction gear 19 is formed by a worm gear mechanism that includes a worm gear 20 and a worm wheel 21 meshing with the worm gear 20.

The reduction gear 19 is accommodated in a gear housing 22 as a transmission mechanism housing. The reduction ratio (gear ratio) of the reduction gear 19 is hereinafter sometimes represented by N. The reduction ratio N is defined as the ratio $\omega_{wg}/\omega_{ww}$ of the angular velocity $\omega_{wg}$ of the worm gear 20 to the angular velocity $\omega_{ww}$ of the worm wheel 21. The worm gear 20 is rotationally driven by the electric motor 18. The worm wheel 21 is coupled to the output shaft 9 so as to be rotatable therewith.

When the worm gear 20 is rotationally driven by the electric motor 18, the worm wheel 21 is rotationally driven, so that motor torque is applied to the steering shaft 6 and the steering shaft 6 (the output shaft 9) is rotated accordingly. The rotation of the steering shaft 6 is transmitted to the pinion shaft 13 via the intermediate shaft 7. Rotation of the pinion shaft 13 is converted to axial movement of the rack shaft 14. The steered wheels 3 are thus steered.

That is, a steering operation can be assisted by the electric motor 18 and the steered wheels 3 can be steered by rotationally driving the worm gear 20 by the electric motor 18. The electric motor 18 is provided with a rotation angle sensor 23 for detecting the rotation angle of a rotor of the electric motor 18. Torque that is applied to the output shaft 9 includes motor torque from the electric motor 18 and disturbance torque other than the motor torque. The disturbance torque $T_{lc}$ other than the motor torque includes steering torque $T_d$, road surface load torque (road surface reaction force torque) $T_{rl}$, friction torque $T_f$, etc.

The steering torque $T_d$ is torque that is applied from the steering wheel 2 side to the output shaft 9 by the force that is applied to the steering wheel 2 by the driver, the force that is generated by steering inertia, etc. The road surface load torque $T_{rl}$ is torque that is applied from the steered wheel 3 side to the output shaft 9 via the rack shaft 14 by the self-aligning torque that is generated on tires, the force that is generated by suspension and wheel alignment, the friction force of the rack and pinion mechanism, etc.

The friction torque $T_f$ is friction torque that is not included in the steering torque $T_d$ and the road surface load torque $T_{rl}$ out of friction torque that is applied to the output shaft 9. The friction torque $T_f$ is mainly comprised of friction torque that is generated by the reduction gear 19 (friction torque that is generated between the worm wheel 21 and the worm gear 20). The vehicle is equipped with a charge coupled device (CCD) camera 25, a global positioning system (GPS) 26, a radar 27, and a map information memory 28. The CCD camera 25 captures images of the road ahead in the direction in which the vehicle is traveling. The GPS 26 detects the position of the vehicle. The radar 27 detects the road profile and obstacles. The map information memory 28 has map information stored therein.

The CCD camera 25, the GPS 26, the radar 27, and the map information memory 28 are connected to an upper electronic control unit (ECU) 201 for performing driver assistance control and autonomous driving control. The upper ECU 201 perceives the surrounding environment, estimates the position of the vehicle, plans a route, etc. based on the map information and the information obtained by the CCD camera 25, the GPS 26, and the radar 27 and determines control target values of steering operation and a driving actuator.

In the present embodiment, the upper ECU 201 sets an automatic steering command value $\theta_{adac}$ for automatic steering. In the present embodiment, automatic steering control is, e.g., control for moving the vehicle along a target path. The automatic steering command value $\theta_{adac}$ is a target value of the steering angle for autonomously moving the vehicle along a target path. Since the process of setting such an automatic steering command value $\theta_{adac}$ is well-known in the art, detailed description thereof will be omitted.

The automatic steering command value $\theta_{adac}$ that is set by the upper ECU 201 is input to a motor control ECU 202 via an on-board network. The steering torque $T_d$ detected by the torque sensor 12 and an output signal of the rotation angle sensor 23 are input to the motor control ECU 202. The motor control ECU 202 controls the electric motor 18 based on these input signals and information received from the upper ECU 201.

Figure 2:
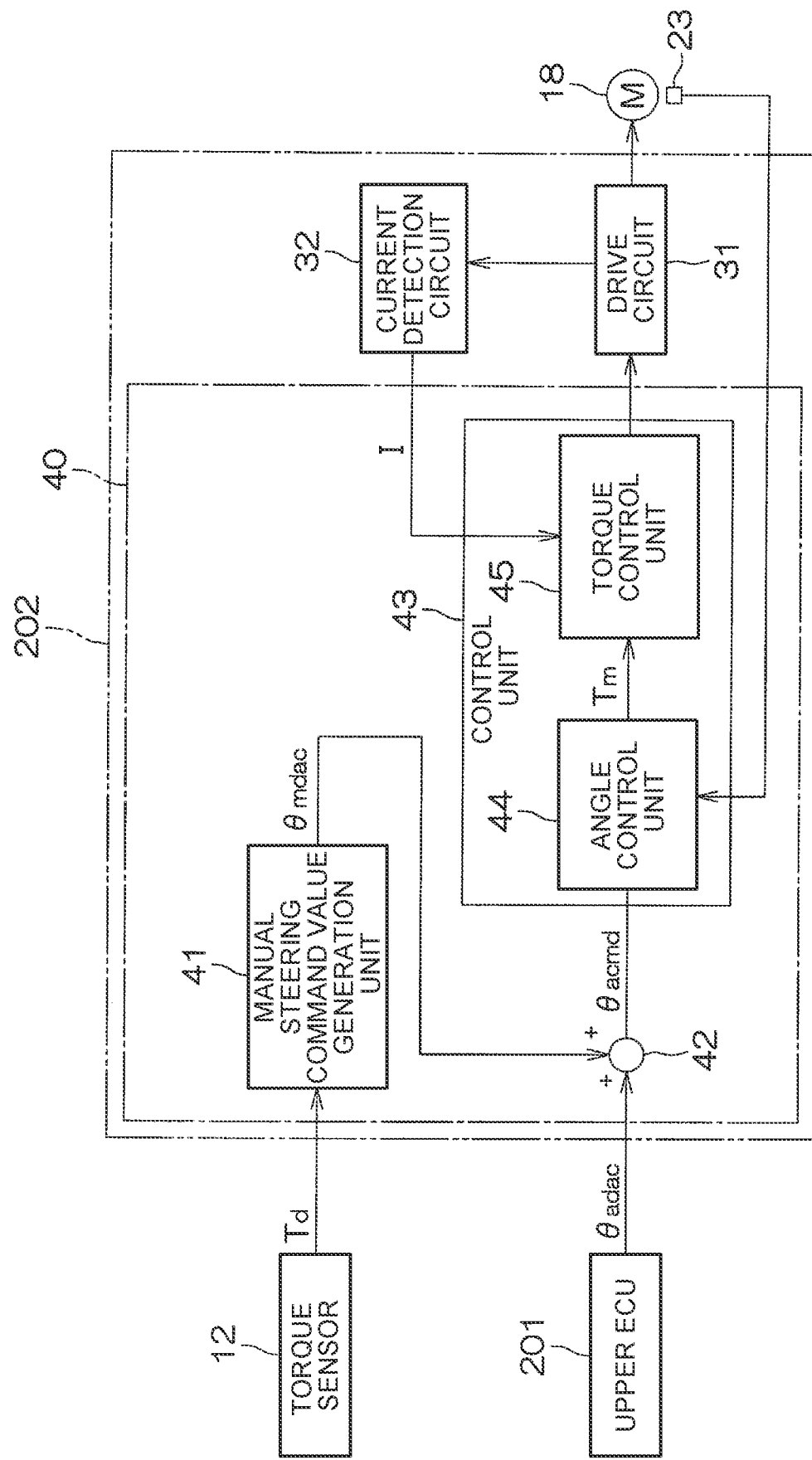
FIG. 2 is a block diagram illustrating the electric configuration of a motor control electronic control unit (ECU)

FIG. 2 is a block diagram illustrating the electric configuration of the motor control ECU 202. The motor control ECU 202 includes a microcomputer 40, a drive circuit (inverter circuit) 31, and a current detection circuit 32. The drive circuit (inverter circuit) 31 is controlled by the microcomputer 40 to supply electric power to the electric motor 18. The current detection circuit 32 detects a current flowing in the electric motor 18 (hereinafter referred to as the "motor current I").

The microcomputer 40 includes a central processing unit (CPU) and memories (a read-only memory (ROM), a random access memory (RAM), a nonvolatile memory, etc.) and functions as a plurality of functional processing units by executing a predetermined program. The plurality of functional processing units include a manual steering command value generation unit 41, an integrated angle command value calculation unit 42, and a control unit 43. The manual steering command value generation unit 41 is provided in order to set, when the driver operates the steering wheel 2, the steering angle according to the steering wheel operation (to be more exact, the rotation angle θ of the output shaft 9) as a manual steering command value $\theta_{mdac}$. The manual steering command value generation unit 41 generates the manual steering command value $\theta_{mdac}$ by using the steering torque $T_d$ detected by the torque sensor 12. The manual steering command value $\theta_{mdac}$ is an example of the steering angle command value of the disclosure.

The integrated angle command value calculation unit 42 adds the manual steering command value $\theta_{mdac}$ to the automatic steering command value $\theta_{adac}$ set by the upper ECU 201 to calculate an integrated angle command value $\theta_{acmd}$. The control unit 43 controls the angle of the electric motor 18 based on the integrated angle command value $\theta_{acmd}$. More specifically, the control unit 43 controls driving of the drive circuit 31 so that the steering angle θ (the rotation angle θ of the output shaft 9) becomes closer to the integrated angle command value $\theta_{acmd}$.

Figure 3:
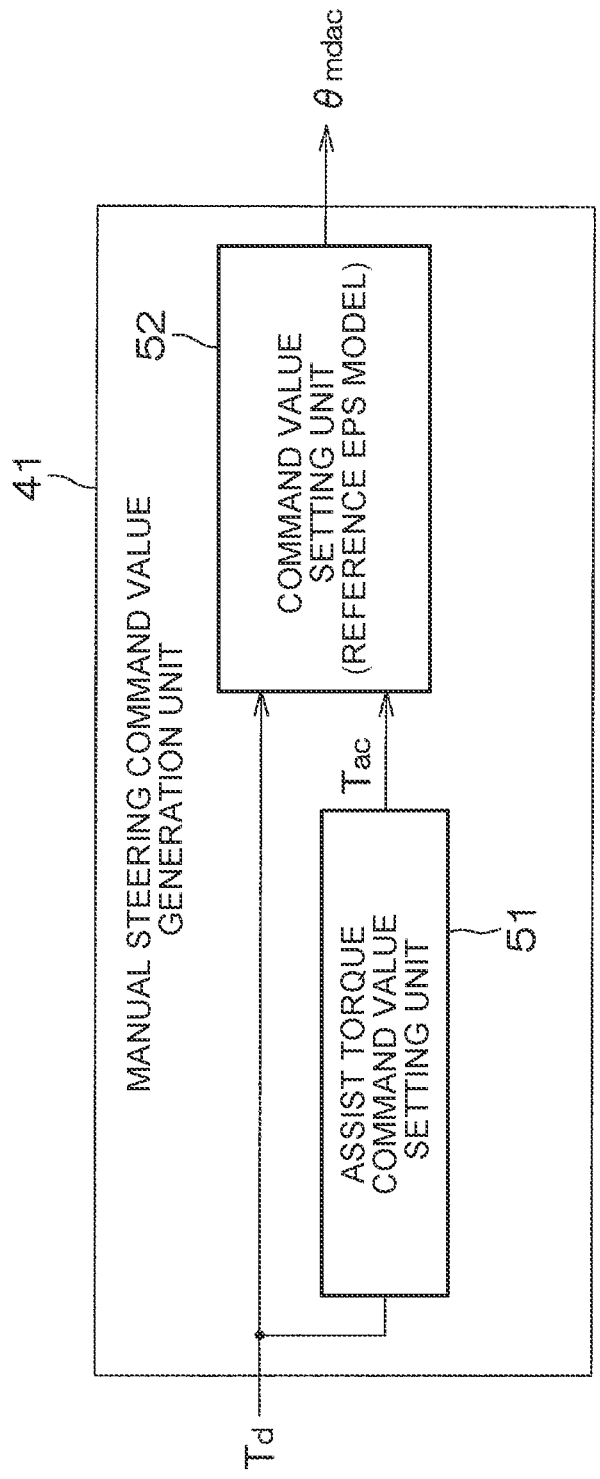
FIG. 3 is a block diagram showing the configuration of a manual steering command value generation unit.

The control unit 43 includes an angle control unit 44 and a torque control unit (current control unit) 45. The angle control unit 44 calculates a motor torque command value $T_m$, which is a target value of motor torque of the electric motor 18, based on the integrated angle command value $\theta_{acmd}$. The torque control unit 45 drives the drive circuit 31 so that the motor torque of the electric motor 18 becomes closer to the motor torque command value $T_m$. FIG. 3 is a block diagram showing the configuration of the manual steering command value generation unit 41.

Figure 4:
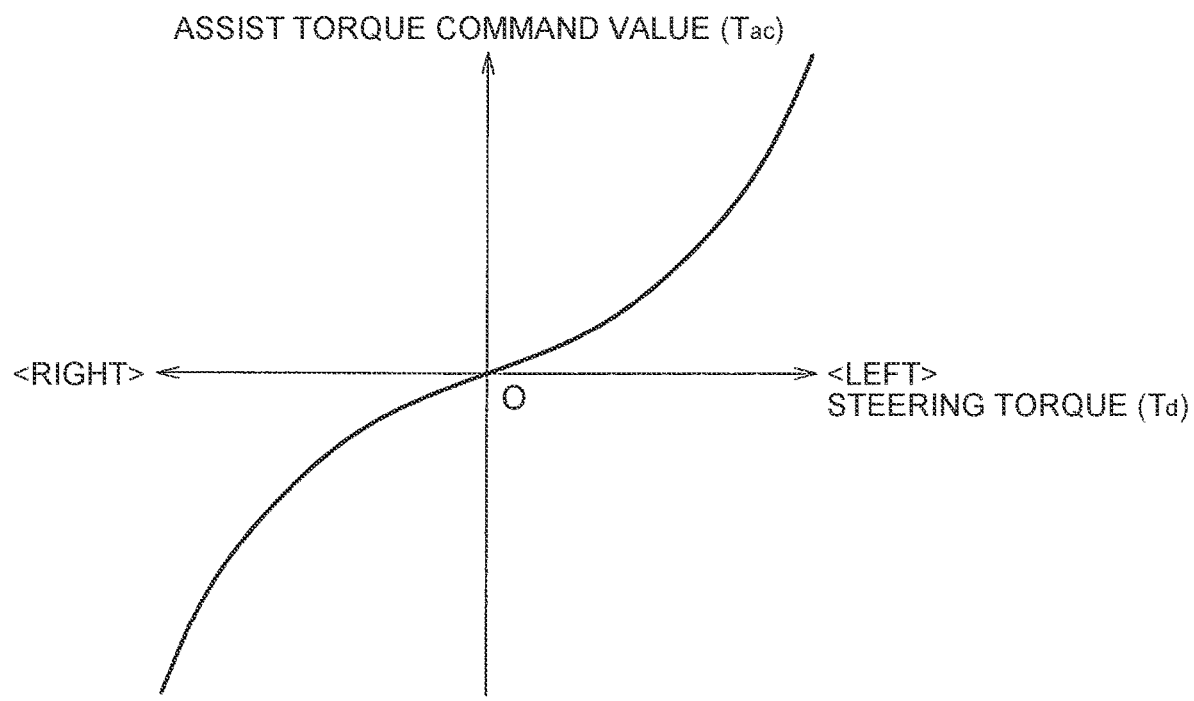
FIG. 4 is a graph showing an example of setting an assist torque command value $T_{ac}$ for steering torque $T_d$.

The manual steering command value generation unit 41 includes an assist torque command value setting unit 51 and a command value setting unit 52. The assist torque command value setting unit 51 sets an assist torque command value $T_{ac}$ that is a target value of assist torque required for manual operation. The assist torque command value setting unit 51 sets the assist torque command value $T_{ac}$ based on the steering torque $T_d$ detected by the torque sensor 12. In the present embodiment, the assist torque command value $T_{ac}$ is a torque command value for a rotary shaft of the electric motor 18. An example of setting the assist torque command value $T_{ac}$ for the steering torque $T_d$ is shown in FIG. 4.

The assist torque command value $T_{ac}$ takes a positive value when the electric motor 18 should generate a steering assist force for steering to the left, and takes a negative value when the electric motor 18 should generate a steering assist force for steering to the right. The assist torque command value $T_{ac}$ takes a positive value for positive steering torque $T_d$ and takes a negative value for negative steering torque $T_d$. The assist torque command value $T_{ac}$ is set so that the larger the absolute value of the steering torque $T_d$ is, the larger the absolute value of the assist torque command value $T_{ac}$ is.

The assist torque command value setting unit 51 may calculate the assist torque command value $T_{ac}$ by multiplying the steering torque $T_d$ by a preset constant. Referring back to FIG. 3, the command value setting unit 52 sets the manual steering command value $\theta_{mdac}$ based on the steering torque $T_d$ and the assist torque command value $T_{ac}$. The command value setting unit 52 basically sets the manual steering command value $\theta_{mdac}$ by using a reference electric power steering (EPS) model in FIG. 5.

Figure 5:
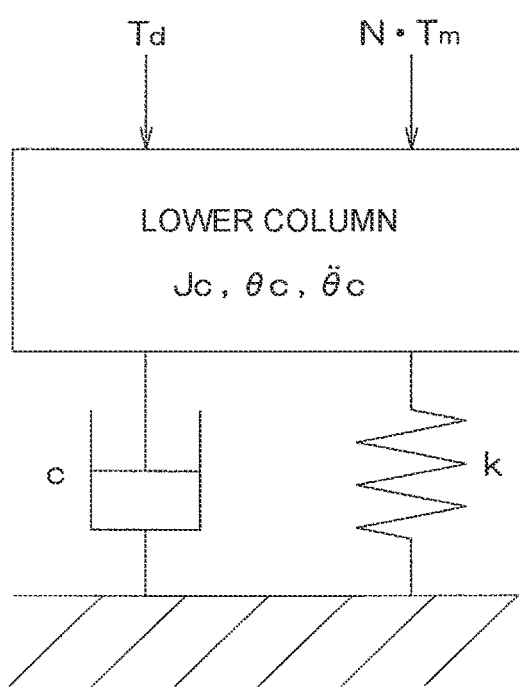
FIG. 5 is a schematic view showing an example of a reference electric power steering (EPS) model that is used in a command value setting unit.

This reference EPS model is a single inertia model including a lower column. The lower column corresponds to the output shaft 9 and the worm wheel 21. In FIG. 5, $J_c$ represents the inertia of the lower column, $\theta_c$ represents the rotation angle of the lower column, and $T_d$ represents the steering torque detected by the torque sensor 12. The steering torque $T_d$, torque $N \cdot T_m$ that is applied from the electric motor 18 to the output shaft 9, and the road surface load torque $T_{rl}$ are applied to the lower column. In the following description, the sum of the steering torque $T_d$ and the torque $N \cdot T_m$ that is applied from the electric motor 18 to the output shaft 9 is sometimes referred to as the "driving torque" as a driving component resulting from the steering torque $T_d$, and the road surface load torque $T_{rl}$ is sometimes referred to as the "virtual reaction force" as a reaction force component.

The road surface load torque $T_{rl}$ is given by the following expression (1) using a spring constant k and a viscous damping coefficient c.

$$T_{rl} = k \cdot \theta_c + c(d\theta_c/dt) \tag{1}$$

In the following description, $k \cdot \theta_c$ is sometimes referred to as the virtual spring reaction force (virtual spring load) $T_{sp}$, and $c(d\theta_c/dt)$ is sometimes referred to as the virtual damper reaction force (virtual damper load) $T_{dam}$.

In the present embodiment, the spring constant k and the viscous damping coefficient c are set to predetermined values obtained in advance by experiments, analyses, etc.

The equation of motion of the reference EPS model is given by the following expression (2).

$$J_c \cdot d^2\theta_c/dt^2 = T_d + N \cdot T_m - T_{rl} \quad (2)$$

Accordingly, it is possible to calculate the rotation angle $\theta_c$ of the lower column by solving the differential equation given by the expression (2) by substituting the steering torque $T_d$ detected by the torque sensor 12 for $T_d$ and substituting the assist torque command value $T_{ac}$ set by the assist torque command value setting unit 51 for $T_m$. This method is herein referred to as the "comparison method." The rotation angle $\theta_c$ of the lower column obtained by the comparison method can be set as the manual steering command value $\theta_{mdac}$.

However, the comparison method may cause the following phenomenon. The range of the steering torque $T_d$ that can be detected by the torque sensor 12 is limited. The steering torque $T_d$ the driver can apply to the steering wheel 2 is also limited. If the steering torque $T_d$ the driver applies to the steering wheel 2 changes to a value larger than the detection upper limit of the torque sensor 12, the detection value of the torque sensor 12 does not change from the detection upper limit. At this time, the reference EPS model in FIG. 5 is in a steady state in which the driving torque and the virtual reaction force are balanced. The manual steering command value $\theta_{mdac}$ is therefore fixed to the value corresponding to the driving torque (the sum of the detection upper limit and assist torque $N \cdot T_{ac}$ corresponding to the detection upper limit), and a manual steering command value $\theta_{mdac}$ larger than this value cannot be calculated. Similarly, if the force the driver applies to the steering wheel 2 reaches the maximum value of the steering torque $T_d$ the driver can apply (hereinafter also referred to as the "steering torque maximum value"), a manual steering command value $\theta_{mdac}$ larger than the manual steering command value $\theta_{mdac}$ corresponding to the driving torque (the sum of the steering torque maximum value and the assist torque $N \cdot T_{ac}$ corresponding to the steering torque maximum value) cannot be calculated.

That is, in the comparison method, the range of the manual steering command value $\theta_{mdac}$ is substantially limited by the detectable range of the torque sensor 12 or the steering torque maximum value. The steering wheel 2 therefore cannot be steered by an amount larger than the limited range. The inventors thought that, in order for the range of the manual steering command value $\theta_{mdac}$ not to be limited by the detectable range of the torque sensor 12 or the steering torque maximum value, the absolute value of the road surface load torque $T_{rl}$ (virtual reaction force) should be made smaller than the maximum possible value of the absolute value of the driving torque given by the expression (2) (in the present embodiment, the absolute value of the sum of the detection upper limit of the torque sensor 12 and the assist torque $N \cdot T_{ac}$ corresponding to the detection upper limit). In the present embodiment, the virtual reaction force is limited in order to make the virtual reaction force (absolute value) smaller than the maximum value (absolute value) of the driving torque. Specifically, in the present embodiment, the absolute value of the virtual spring reaction force $T_{sp}$ is limited to a value equal to or smaller than a limit value.

Figure 6:
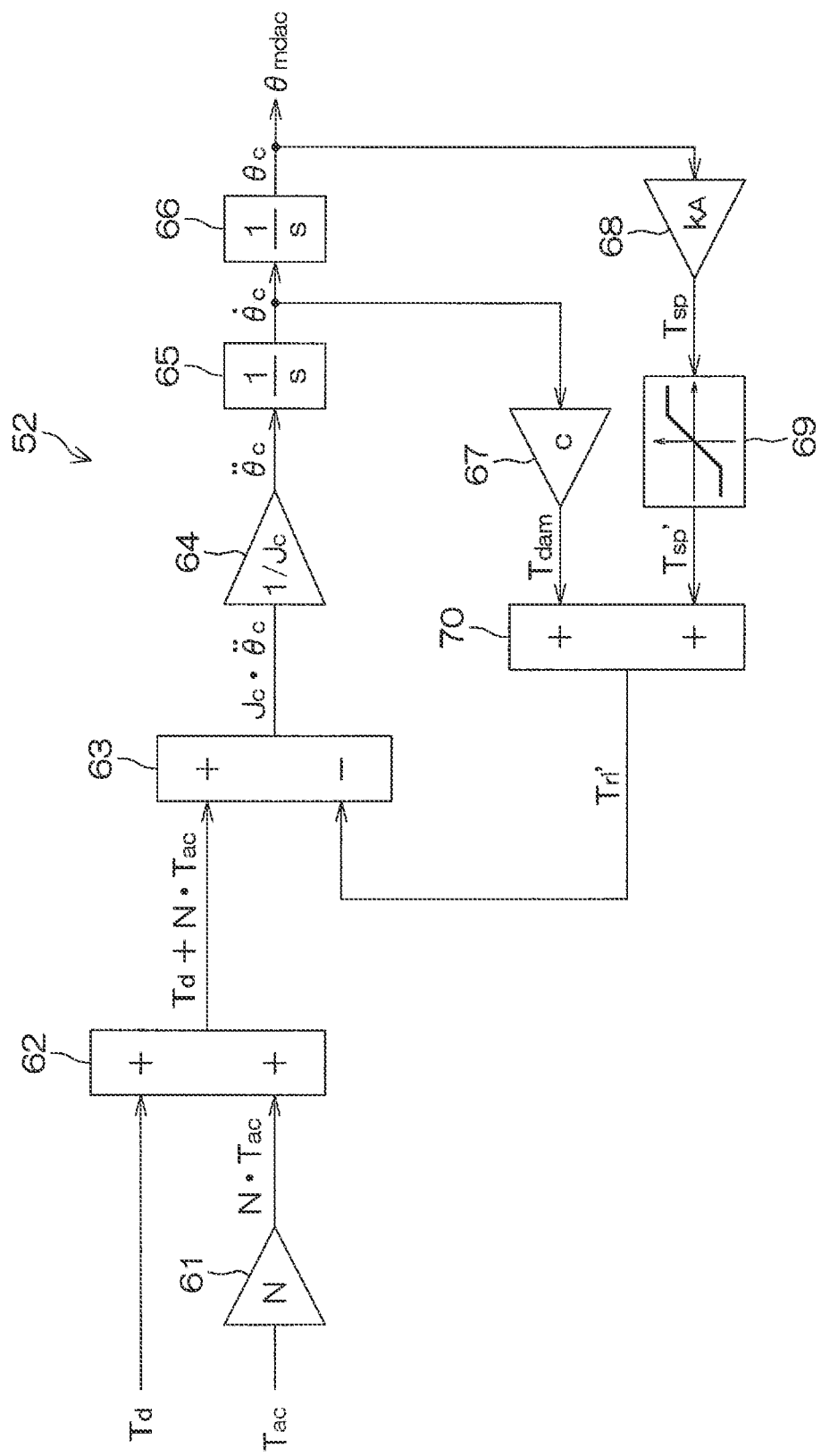
FIG. 6 is a block diagram showing the configuration of the command value setting unit.

FIG. 6 is a block diagram showing the configuration of the command value setting unit 52. The command value setting unit 52 calculates the manual steering command value $\theta_{mdac}$ in every predetermined calculation period. The command value setting unit 52 includes a reduction ratio multiplication unit 61, a first addition unit 62, a subtraction unit 63, an inertia division unit 64, a first integration unit 65, a second integration unit 66, a virtual damper reaction force calculation unit 67, a virtual spring reaction force calculation unit 68, a virtual spring reaction force limiting unit 69, and a second addition unit 70. For convenience of explanation, a preset spring constant is represented by $k_A$.

The reduction ratio multiplication unit 61 converts the assist torque command value $T_{ac}$ for the rotary shaft of the electric motor 18 to an assist torque command value $N \cdot T_{ac}$ for the output shaft 9 by multiplying the assist torque command value $T_{ac}$ set by the assist torque command value setting unit 51 by the reduction ratio N of the reduction gear 19. The first addition unit 62 calculates the driving torque ($T_d + N \cdot T_{ac}$) equivalent to "$T_d + N \cdot T_m$" in the right side of the expression (2) by adding the steering torque $T_d$ detected by the torque sensor 12 to the assist torque command value $N \cdot T_{ac}$ for the output shaft 9.

The subtraction unit 63 calculates the moment of inertia equivalent to the left side "$J_c \cdot d^2\theta_c/dt^2$" of the expression (2) by subtracting a limited virtual reaction force $T_{rl}'$, described below, from the driving torque ($T_d + N \cdot T_{ac}$). The inertia division unit 64 calculates the second derivative $d^2\theta_c/dt^2$ of the lower column rotation angle $\theta_c$ by dividing the moment of inertia $J_c \cdot d^2\theta_c/dt^2$ calculated by the subtraction unit 63 by the inertia $J_c$ of the lower column.

The first integration unit 65 calculates the first derivative $d\theta_c/dt$ of the lower column rotation angle $\theta_c$ by integrating the second derivative $d^2\theta_c/dt^2$ of the lower column rotation angle $\theta_c$. The second integration unit 66 calculates the lower column rotation angle $\theta_c$ by integrating the first derivative $d\theta_c/dt$ of the lower column rotation angle $\theta_c$. This lower column rotation angle $\theta_c$ is output as the manual steering command value $\theta_{mdac}$.

The virtual damper reaction force calculation unit 67 calculates the virtual damper reaction force $T_{dam}$ ($=c \cdot d\theta_c/dt$) by multiplying the first derivative $d\theta_c/dt$ of the lower column rotation angle $\theta_c$ calculated by the first integration unit 65 by the preset viscous damping coefficient c. The virtual spring reaction force calculation unit 68 calculates the virtual spring reaction force $T_{sp}$ ($=k_A \cdot \theta_c$) by multiplying the lower column rotation angle $\theta_c$ (manual steering command value $\theta_{mdac}$) calculated by the second integration unit 66 by the preset spring constant $k_A$.

Figure 7:
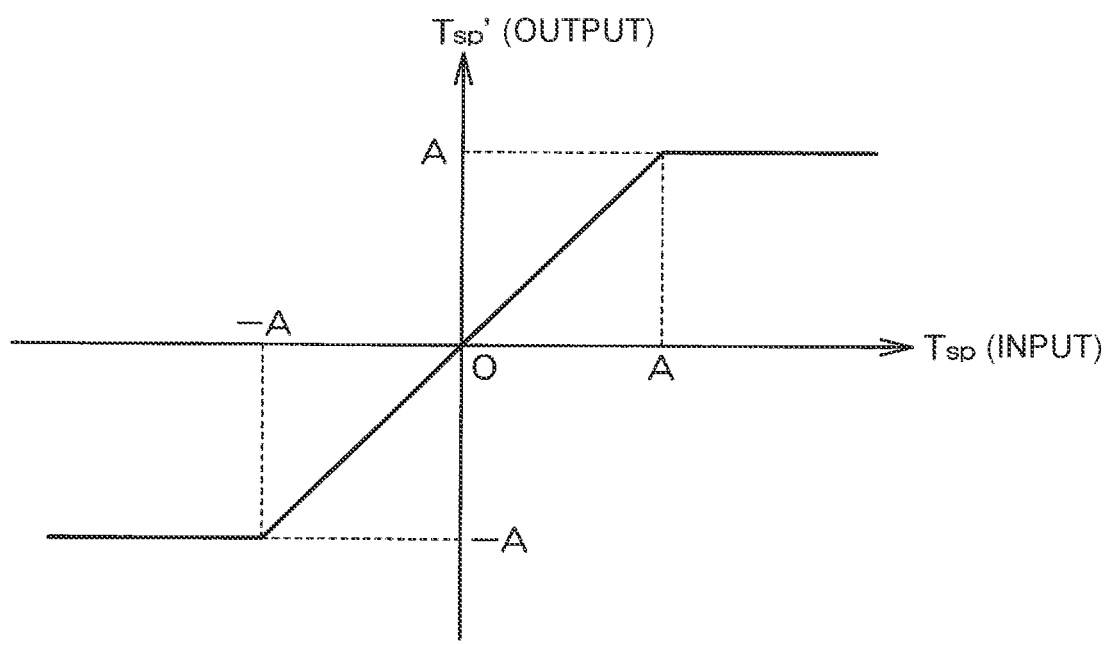
FIG. 7 is a graph showing input and output characteristics of a virtual spring reaction force limiting unit.

The virtual spring reaction force limiting unit 69 limits the absolute value of the virtual spring reaction force $T_{sp}$ to a value equal to or smaller than a predetermined limit value A (A>0). Input and output characteristics of the virtual spring reaction force limiting unit 69 are shown in FIG. 7. The virtual spring reaction force limiting unit 69 outputs the received virtual spring reaction force $T_{sp}$ as it is when the received virtual spring reaction force $T_{sp}$ is in the range of $-A \leq T_{sp} \leq A$. The virtual spring reaction force limiting unit 69 outputs the limit value A when the received virtual spring reaction force $T_{sp}$ is larger than A. The virtual spring reaction force limiting unit 69 outputs $-A$ when the received virtual spring reaction force $T_{sp}$ is smaller than $-A$.

The second addition unit 70 calculates the limited virtual reaction force $T_{rl}'$ ($=T_{dam} + T_{sp}'$) by adding a virtual spring reaction force $T_{sp}'$ resulting from the limiting process by the virtual spring reaction force limiting unit 69 to the virtual damper reaction force $T_{dam}$. This limited virtual reaction force $T_{rl}'$ ($=T_{dam} + T_{sp}'$) is input to the subtraction unit 63. The limit value A is set to a predetermined value obtained in advance by experiments, analyses, etc. so that the absolute value of the limited virtual reaction force $T_{rl}'$ becomes smaller than the maximum possible value of the absolute value of the driving torque.

Figure 8:
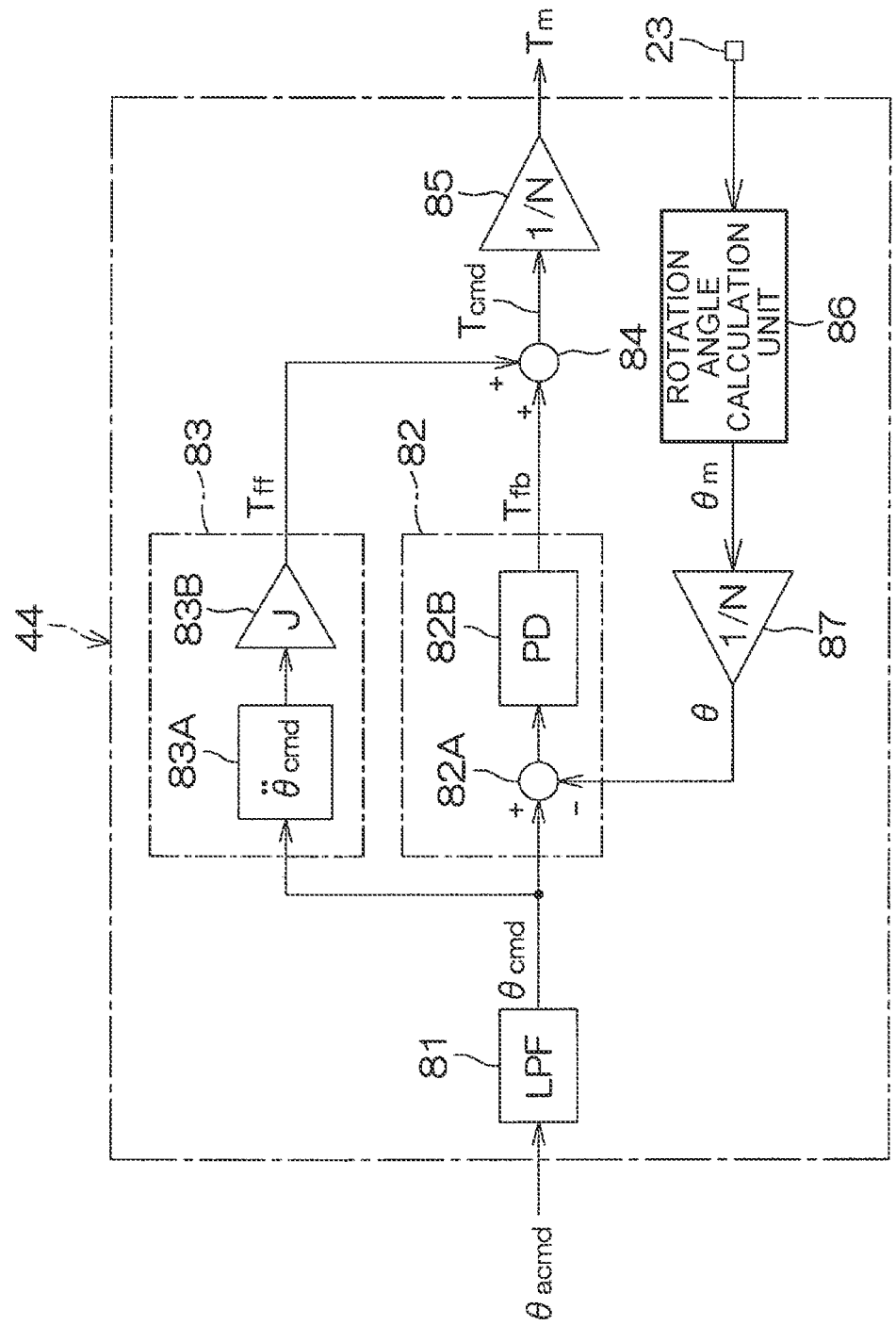
FIG. 8 is a block diagram showing the configuration of an angle control unit.

FIG. 8 is a block diagram showing the configuration of the angle control unit 44. The angle control unit 44 calculates the motor torque command value $T_m$ based on the integrated angle command value $\theta_{acmd}$. The angle control unit 44 includes a low pass filter (LPF) 81, a feedback control unit 82, a feedforward control unit 83, a torque addition unit 84, a first reduction ratio division unit 85, a rotation angle calculation unit 86, and a second reduction ratio division unit 87.

The rotation angle calculation unit 86 calculates the rotor rotation angle $\theta_m$ of the electric motor 18 based on the output signal of the rotation angle sensor 23. The second reduction ratio division unit 87 converts the rotor rotation angle $\theta_m$ to the rotation angle (actual steering angle) $\theta$ of the output shaft 9 by dividing the rotor rotation angle $\theta_m$ calculated by the rotation angle calculation unit 86 by the reduction ratio N. The low pass filter 81 performs low pass filtering of the integrated angle command value $\theta_{acmd}$. The integrated angle command value $\theta_{cmd}$ resulting from the low pass filtering is input to the feedback control unit 82 and the feedforward control unit 83.

The feedback control unit 82 is provided in order to make the actual steering angle $\theta$ calculated by the second reduction ratio division unit 87 closer to the integrated angle command value $\theta_{cmd}$ resulting from the low pass filtering. The feedback control unit 82 includes an angle deviation calculation unit 82A and a proportional-derivative (PD) control unit 82B. The angle deviation calculation unit 82A calculates the deviation $\Delta\theta$ ($=\theta_{cmd}-\theta$) between the integrated angle command value $\theta_{cmd}$ and the actual steering angle $\theta$.

The PD control unit 82B calculates feedback control torque $T_{fb}$ by performing proportional-derivative calculation (PD calculation) on the angle deviation $\Delta\theta$ calculated by the angle deviation calculation unit 82A. The feedback control torque $T_{fb}$ is input to the torque addition unit 84. The feedforward control unit 83 is provided in order to compensate for the delay of the response due to the inertia of the electric power steering system 1 to improve the control response. The feedforward control unit 83 includes an angular acceleration calculation unit 83A and an inertia multiplication unit 83B. The angular acceleration calculation unit 83A calculates a target angular acceleration $d^2\theta_{cmd}/dt^2$ by calculating the second derivative of the integrated angle command value $\theta_{cmd}$.

The inertia multiplication unit 83B calculates feedforward control torque $T_{ff}$ ($=J\cdot d^2\theta_{cmd}/dt^2$) by multiplying the target angle acceleration $d^2\theta_{cmd}/dt^2$ calculated by the angular acceleration calculation unit 83A by the inertia J of the electric power steering system 1. For example, the inertia J is obtained from a physical model (not shown) of the electric power steering system 1. The feedforward control torque $T_{ff}$ is input to the torque addition unit 84 as an inertia compensation value.

The torque addition unit 84 calculates a steering torque command value $T_{cmd}$ ($=T_{fb}+T_{ff}$) by adding the feedforward control torque $T_{ff}$ to the feedback control torque $T_{fb}$. The steering torque command value $T_{cmd}$ is a torque command value for the output shaft 9. The steering torque command value $T_{cmd}$ is input to the first reduction ratio division unit 85. The first reduction ratio division unit 85 calculates the motor torque command value $T_m$ by dividing the steering torque command value $T_{cmd}$ by the reduction ratio N. This motor torque command value $T_m$ is input to the torque control unit 45 (see FIG. 2).

Figure 9:
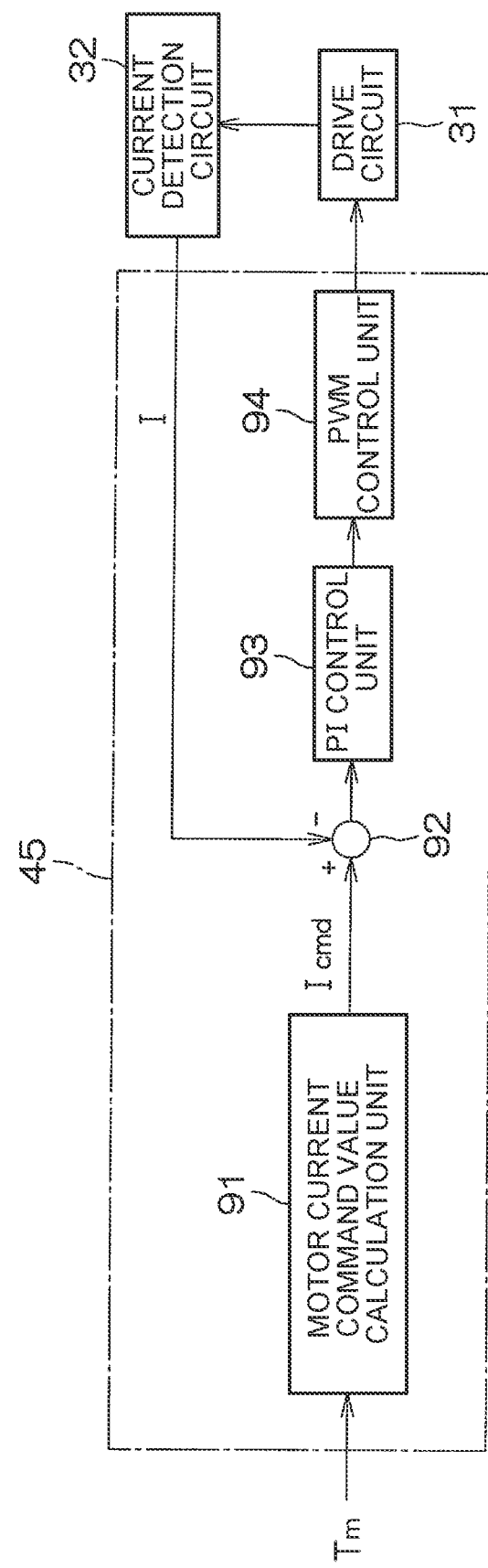
FIG. 9 is a schematic view showing the configuration of a torque control unit.

FIG. 9 is a schematic view showing the configuration of the torque control unit 45. The torque control unit 45 (see FIG. 2) includes a motor current command value calculation unit 91, a current deviation calculation unit 92, a proportional-integral (PI) control unit 93, and a pulse width modulation (PWM) control unit 94. The motor current command value calculation unit 91 calculates a motor current command value $I_{cmd}$ by dividing the motor torque command value $T_m$ calculated by the angle control unit 44 (see FIGS. 2 and 8) by a torque constant $K_t$ of the electric motor 18.

The current deviation calculation unit 92 calculates the deviation $\Delta I$ ($=I_{cmd}-I$) between the motor current command value $I_{cmd}$ calculated by the motor current command value calculation unit 91 and the motor current I detected by the current detection circuit 32. The PI control unit 93 generates a drive command value for making the motor current I flowing in the electric motor 18 closer to the motor current command value $I_{cmd}$ by performing proportional-integral calculation (PI calculation) on the current deviation $\Delta I$ calculated by the current deviation calculation unit 92. The PWM control unit 94 generates a PWM control signal of the duty ratio corresponding to the drive command value and supplies the PWM control signal to the drive circuit 31. Electric power corresponding to the drive command value is thus supplied to the electric motor 18.

In the above embodiment, the manual steering command value $\theta_{mdac}$ is added to the automatic steering command value $\theta_{adac}$ to calculate the integrated angle command value $\theta_{acmd}$, and the electric motor 18 is controlled based on the integrated angle command value $\theta_{acmd}$. Cooperative control can thus be implemented which allows manual steering to be performed while performing steering control mainly by automatic steering control without switching steering control between manual steering control and automatic steering control. Since steering control can be seamlessly transitioned between manual steering control and automatic steering control, the driver does not feel discomfort during manual steering.

In the above embodiment, the absolute value of the virtual spring reaction force $T_{sp}$ that is used to calculate the manual steering command value $\theta_{mdac}$ is limited to a value equal to or smaller than the predetermined limit value A, whereby the absolute value of the limited virtual spring reaction force $T_{rl}$ is limited to a value smaller than the maximum possible value of the absolute value of the driving torque (the absolute value of the sum of the detection upper limit of the torque sensor 12 and the assist torque $N\cdot T_{ac}$ corresponding to this detection upper limit). Accordingly, even if the steering torque $T_d$ larger than the detection upper limit of the torque sensor 12 has been applied to the steering wheel 2 and the detection value of the torque sensor 12 has not changed from the detection upper limit, the reference EPS model of FIG. 5 is not in the steady state in which the driving torque and the virtual reaction force are balanced. That is, since the manual steering command value $\theta_{mdac}$ is not fixed to the value corresponding to the driving torque (the sum of the detection upper limit and the assist torque $N\cdot T_{ac}$ corresponding to the detection upper limit), the driver's steering operation is not limited.

Figure 10:
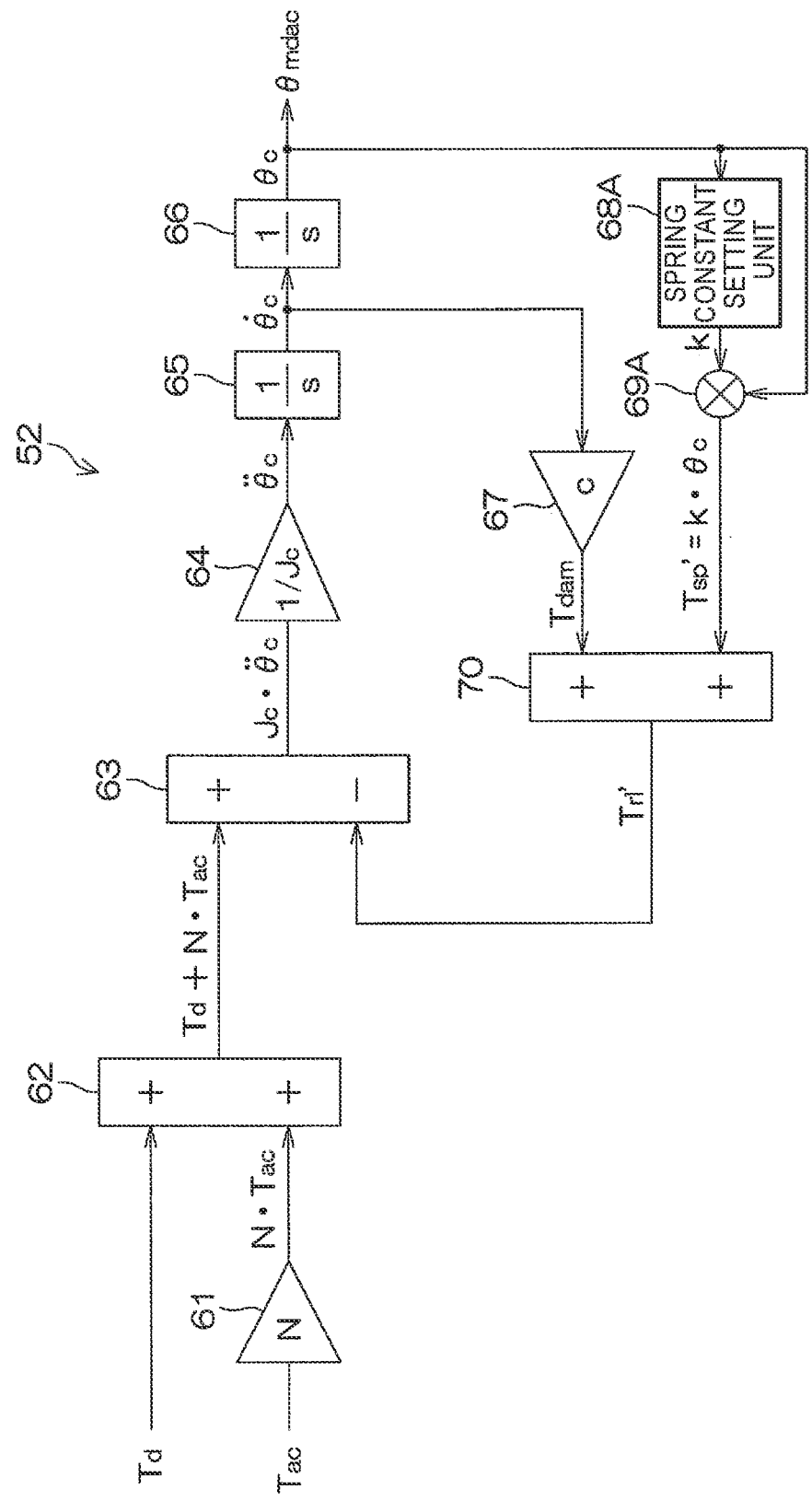
FIG. 10 is a block diagram showing a first modification of the command value setting unit.

FIG. 10 is a block diagram showing a first modification of the command value setting unit 52. In FIG. 10, the portions corresponding to those in FIG. 6 are denoted with the same reference characters as those in FIG. 6. In the command value setting unit 52 of FIG. 10, the configuration formed by the virtual spring reaction force calculation unit 68 and the virtual spring reaction force limiting unit 69 in FIG. 6 is replaced with the configuration formed by a spring constant setting unit 68A and a virtual spring reaction force calculation unit 69A. The virtual spring reaction force calculation unit 69A calculates a limited virtual spring reaction force $T_{sp}'$.

Figure 11:
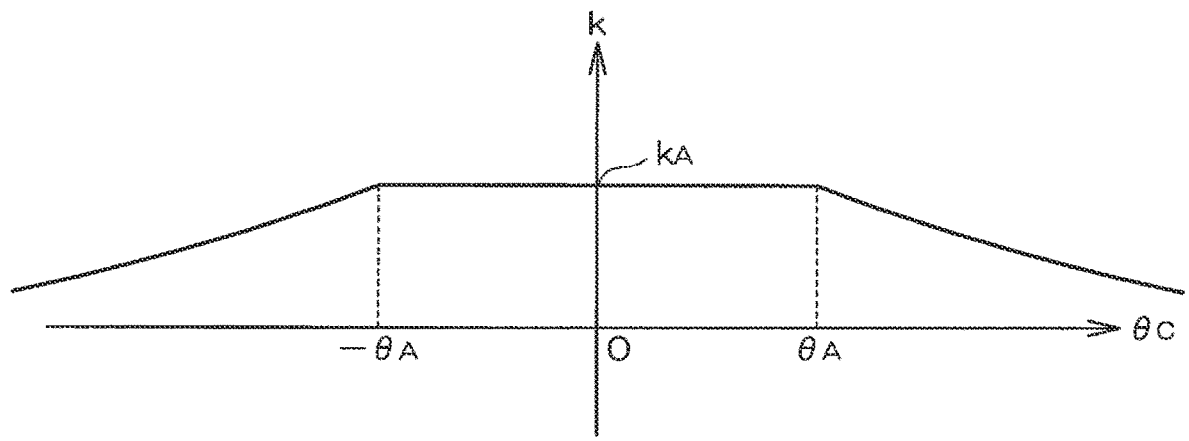
FIG. 11 is a graph showing an example of setting a spring constant k for a lower column rotation angle $\theta_c$.

The spring constant setting unit 68A sets a spring constant k based on the lower column rotation angle $\theta_c$ (manual steering command value $\theta_{mdac}$) calculated by the second integration unit 66 and a preset spring constant $k_A$. An example of setting the spring constant k for the lower column rotation angle $\theta_c$ is shown in FIG. 11. When the lower column rotation angle $\theta_c$ is in the range of $-\theta_A \leq \theta_c \leq \theta_A$, the spring constant k is set to the preset predetermined value $k_A$. When the lower column rotation angle $\theta_c$ is smaller than $-\theta_A$ or larger than $\theta_A$, the spring constant k is set so that the larger the absolute value of the lower column rotation angle $\theta_c$ is, the smaller the absolute value of the spring constant k is. More specifically, when the lower column rotation angle $\theta_c$ is smaller than $-\theta_A$ or larger than $\theta_A$, the spring constant k is calculated based on the expression $k=k_A \cdot \theta_A/|\theta_c|$.

Figure 12:
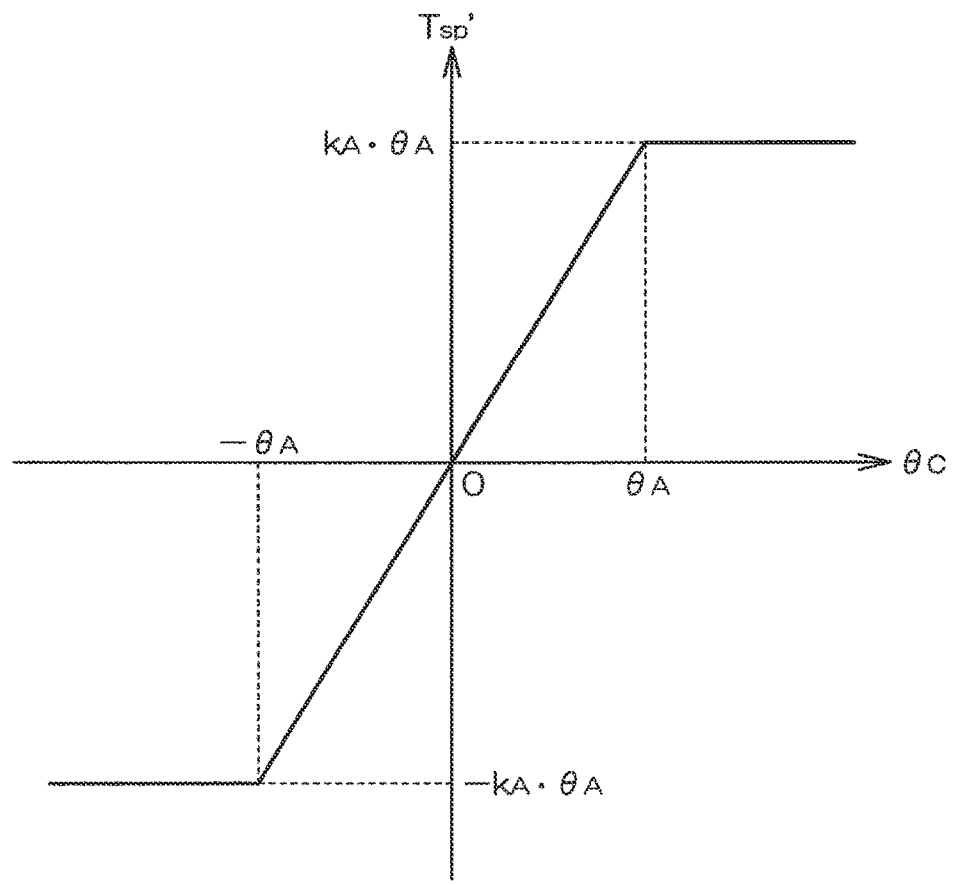
FIG. 12 is a graph showing the relationship between a lower column rotation angle $\theta_c$ that is calculated by a second integration unit and a limited virtual spring reaction force $T_{sp}'$ that is calculated by a virtual spring reaction force calculation unit.

The virtual spring reaction force calculation unit 69A calculates the limited virtual spring reaction force $T_{sp}'$ ($=k \cdot \theta_c$) by multiplying the lower column rotation angle $\theta_c$ calculated by the second integration unit 66 by the spring constant k calculated by the spring constant setting unit 68A. FIG. 12 is a graph showing the relationship between the lower column rotation angle $\theta_c$ that is calculated by the second integration unit 66 and the limited virtual spring reaction force $T_{sp}'$ that is calculated by the virtual spring reaction force calculation unit 69A.

When the lower column rotation angle $\theta_c$ is in the range of $-\theta_A \leq \theta_c \leq \theta_A$, the limited virtual spring reaction force $T_{sp}'$ is $k_A \cdot \theta_c$. That is, in this case, the virtual spring reaction force $T_{sp}$ ($=kA \cdot \theta_c$) is not limited. On the other hand, when the lower column rotation angle $\theta_c$ is smaller than $-\theta_A$ or larger than $\theta_A$, the absolute value of the limited virtual spring reaction force $T_{sp}'$ is fixed to a predetermined value represented by $k_A \cdot \theta_A$. That is, in this case, the absolute value of the virtual spring reaction force $T_{sp}$ ($=k_A \cdot \theta_c$) is limited to a value equal to or smaller than the predetermined value. The spring constant $k_A$ and the lower column rotation angle $\theta_A$ are set to predetermined values obtained in advance by experiments, analyses, etc. so that the limited virtual reaction force $T_{rl}'$ becomes smaller than the maximum possible value of the absolute value of the driving torque. Accordingly, the first modification has effects similar to those of the above embodiment.

Figure 13:
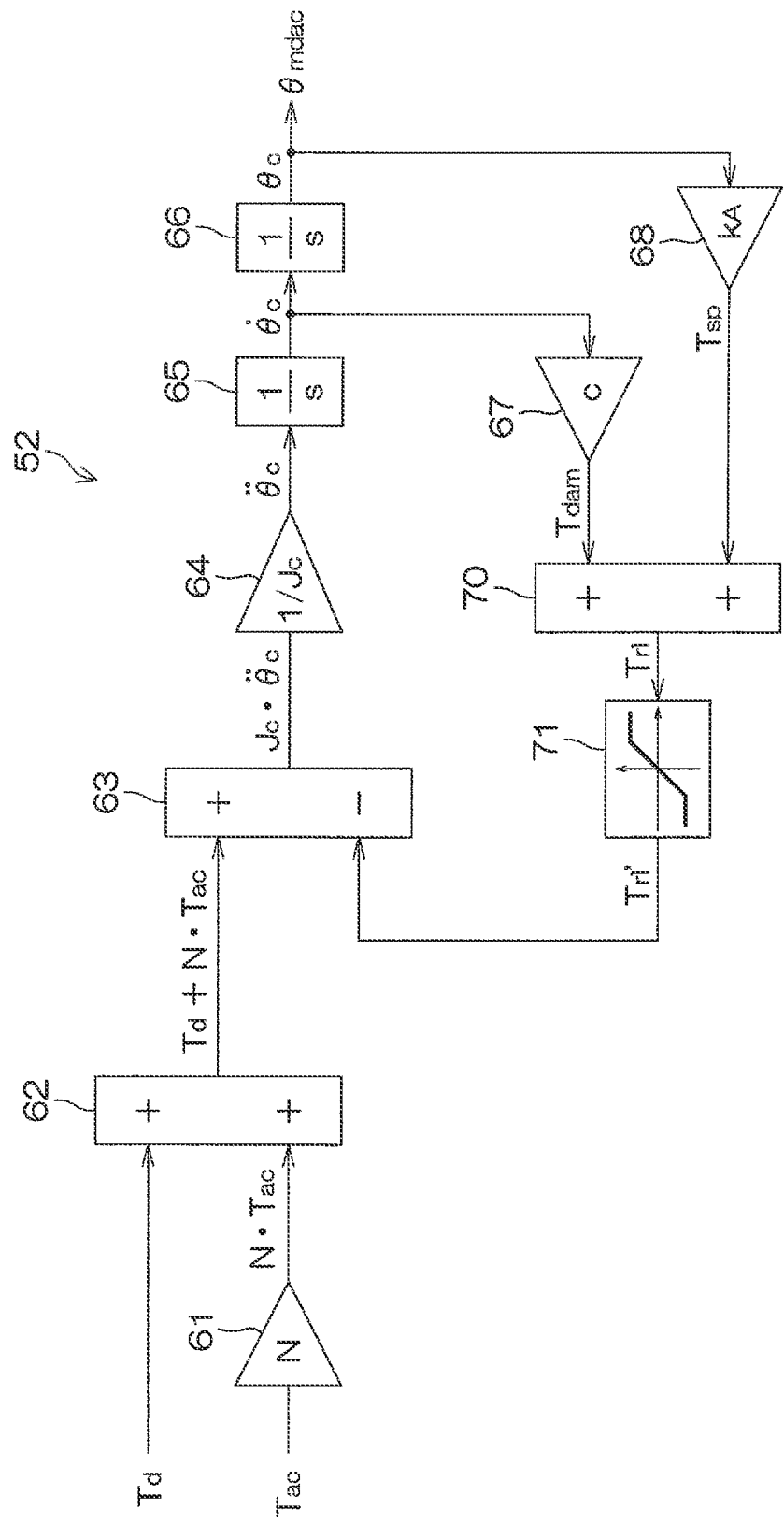
FIG. 13 is a block diagram showing a second modification of the command value setting unit.

FIG. 13 is a block diagram showing a second modification of the command value setting unit 52. In FIG. 13, the portions corresponding to those in FIG. 6 are denoted with the same reference characters as those in FIG. 6. The command value setting unit 52 of FIG. 13 does not include the virtual spring reaction force limiting unit 69 of FIG. 6. Instead, the command value setting unit 52 of FIG. 13 includes a virtual reaction force limiting unit 71 in a stage following the second addition unit 70.

Figure 14:
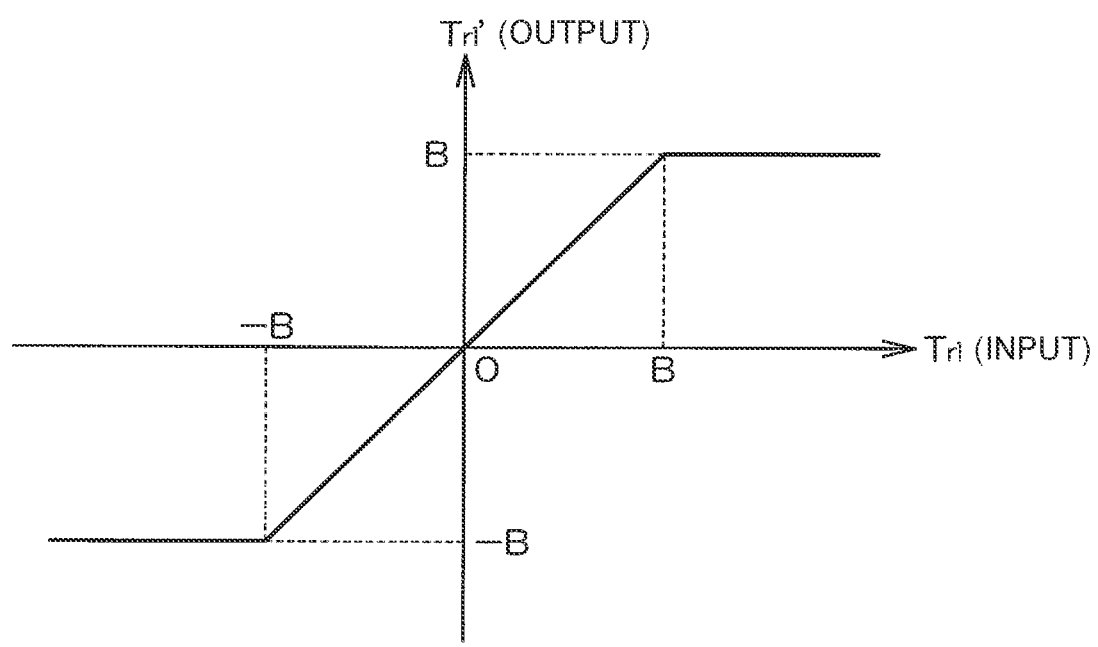
FIG. 14 is a graph showing input and output characteristics of a virtual reaction force limiting unit.

The second addition unit 70 calculates a virtual reaction force $T_{rl}$ ($=T_{dam}+T_{sp}$) by adding the virtual spring reaction force $T_{sp}$ calculated by the virtual spring reaction force calculation unit 68 to the virtual damper reaction force $T_{dam}$ calculated by the virtual damper reaction force calculation unit 67. The virtual reaction force limiting unit 71 limits the absolute value of the virtual reaction force $T_{rl}$ calculated by the second addition unit 70 to a value equal to or smaller than a predetermined limit value B (B>0). Input and output characteristics of the virtual reaction force limiting unit 71 are shown in FIG. 14. The virtual reaction force limiting unit 71 outputs the received virtual reaction force $T_{rl}$ as it is when the received virtual reaction force $T_{rl}$ is in the range of $-B \leq T_{rl} \leq B$. The virtual reaction force limiting unit 71 outputs the limit value B when the received virtual reaction force $T_{rl}$ is larger than B. The virtual reaction force limiting unit 71 outputs $-B$ when the received virtual reaction force $T_{rl}$ is smaller than $-B$. The limit value B is set to a predetermined value obtained in advance by experiments, analyses, etc. The virtual reaction force $T_{rl}'$ resulting from the limiting process of the virtual reaction force limiting unit 71 is input to the subtraction unit 63. The limit value B is set to a predetermined value obtained in advance by experiments, analyses, etc. so that the limited virtual reaction force $T_{rl}'$ becomes smaller than the maximum possible value of the absolute value of the driving torque.

In the second modification as well, the absolute value of the virtual reaction force is limited to a value equal to or smaller than the predetermined value. The second modification therefore has effects similar to those of the above embodiment. Although one embodiment of the disclosure is described above, the disclosure may be carried out in other forms. For example, although the angle control unit 44 (see FIG. 6) includes the feedforward control unit 83 in the above embodiment, the feedforward control unit 83 may be omitted.

Although the manual steering command value generation unit 41 includes the assist torque command value setting unit 51 in the above embodiment, the assist torque command value setting unit 51 may be omitted. In this case, the torque $N \cdot T_m$ that is applied from the electric motor 18 to the output shaft 9 is omitted from the reference EPS model, and the driving torque is comprised only of the steering torque $T_d$ that is detected by the torque sensor 12.

Although the above embodiment is described with respect to an example in which the disclosure is applied to motor control of column type EPS. However, the disclosure is also applicable to motor control of EPS other than the column type EPS. The disclosure is also applicable to control of electric motors for controlling the steering angle of a steer-by-wire system. Various design modifications can be made to the disclosure without departing from the spirit and scope of the claims.

What is claimed is:

1. A motor control device for controlling driving of an electric motor that controls a steering angle of a steering device, the motor control device comprising:
    a torque sensor configured to detect steering torque acting on a steering member, and
    an electronic control unit configured to:
        generate a steering angle command value based on the steering torque by using an equation of motion that is a reference model of the steering device;
        control driving of the electric motor so that an actual steering angle follows the steering angle command value;
        limit a virtual reaction force that is a reaction force component of the equation of motion; and
    limit the virtual reaction force in the equation of motion so that an absolute value of the virtual reaction force becomes smaller than a maximum possible value of an absolute value of driving torque that is a driving component resulting from the steering torque.

2. The motor control device according to claim 1, wherein:
    the virtual reaction force includes a virtual spring reaction force; and
    the electronic control unit is configured to limit an absolute value of the virtual spring reaction force to a value equal to or smaller than a first predetermined value.

3. The motor control device according to claim 1, wherein:
the virtual reaction force is a sum of a virtual spring reaction force and a virtual damper reaction force; and
the electronic control unit is configured to limit an absolute value of the sum of the virtual spring reaction force and the virtual damper reaction force to a value equal to or smaller than a second predetermined value.

4. The motor control device according to claim 1, wherein:
the virtual reaction force includes a virtual spring reaction force that is calculated as a product of a spring constant and the steering angle command value;
the electronic control unit is configured to set the spring constant to a fourth predetermined value when an absolute value of the steering angle command value is equal to or smaller than a third predetermined value; and
the electronic control unit is configured to reduce the spring constant to a value smaller than the fourth predetermined value when the absolute value of the steering angle command value is larger than the third predetermined value.

5. A motor control method for controlling driving of an electric motor that controls a steering angle of a steering device, the motor control method comprising:
detecting, by a torque sensor, steering torque acting on a steering member;
generating, by an electronic control unit, a steering angle command value based on the steering torque by using an equation of motion that is a reference model of the steering device;
controlling, by the electronic control unit, driving of the electric motor so that an actual steering angle follows the steering angle command value;
limiting, by the electronic control unit, a virtual reaction force that is a reaction force component of the equation of motion; and
limiting, by the electronic control unit, the virtual reaction force in the equation of motion so that an absolute value of the virtual reaction force becomes smaller than a maximum possible value of an absolute value of driving torque that is a driving component resulting from the steering torque.

* * * * *